(12) United States Patent
Hooker et al.

(10) Patent No.: US 8,291,172 B2
(45) Date of Patent: Oct. 16, 2012

(54) MULTI-MODAL DATA PREFETCHER

(75) Inventors: Rodney E. Hooker, Austin, TX (US); Colin Eddy, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 285 days.

(21) Appl. No.: 12/869,386

(22) Filed: Aug. 26, 2010

(65) Prior Publication Data

US 2011/0264860 A1    Oct. 27, 2011

Related U.S. Application Data (60) Provisional application No. 61/328,530, filed on Apr. 27, 2010.

(51) Int. Cl.
  *G06F 13/00* (2006.01)
  *G06F 13/28* (2006.01)
(52) U.S. Cl. ................ 711/137; 711/E12.004
(58) Field of Classification Search .......... 711/137, 711/E12.004
See application file for complete search history.

(56) References Cited

U.S. PATENT DOCUMENTS

| | | | |
|---|---|---|---|
| 5,003,471 A | 3/1991 | Gibson | |
| 2005/0223175 A1* | 10/2005 | Hepner et al. | 711/137 |
| 2007/0043908 A1* | 2/2007 | Diefendorff | 711/137 |
| 2009/0006762 A1 | 1/2009 | Gara et al. | |
| 2009/0138661 A1* | 5/2009 | Lauterbach | 711/137 |
| 2009/0198909 A1 | 8/2009 | Speight et al. | |
| 2010/0030973 A1* | 2/2010 | Speight et al. | 711/137 |
| 2011/0238920 A1 | 9/2011 | Hooker et al. | |
| 2011/0238922 A1 | 9/2011 | Hooker et al. | |
| 2011/0238923 A1 | 9/2011 | Hooker et al. | |

OTHER PUBLICATIONS

Preiss, Edmund. "Intel® Core™ Microarchitecture." EMEA Software Solutions Group. pp. 1-32. Downloaded Dec. 22, 2009 from http://www.polyhedron.com/web_images/documents/MicroArchitecture.pdf.

* cited by examiner

*Primary Examiner* — Edward Dudek, Jr.
(74) *Attorney, Agent, or Firm* — E. Alan Davis; James W. Huffman (57) ABSTRACT

A microprocessor includes first and second cache memories occupying distinct hierarchy levels, the second backing the first. A prefetcher monitors load operations and maintains a recent history of the load operations from a cache line and determines whether the recent history indicates a clear direction. The prefetcher prefetches one or more cache lines into the first cache memory when the recent history indicates a clear direction and otherwise prefetches the one or more cache lines into the second cache memory. The prefetcher also determines whether the recent history indicates the load operations are large and, other things being equal, prefetches a greater number of cache lines when large than small. The prefetcher also determines whether the recent history indicates the load operations are received on consecutive clock cycles and, other things being equal, prefetches a greater number of cache lines when on consecutive clock cycles than not.

37 Claims, 4 Drawing Sheets

MULTI-MODAL DATA PREFETCHER

CROSS REFERENCE TO RELATED APPLICATION(S)

This application claims priority based on U.S. Provisional Application Ser. No. 61/328,530, filed Apr. 27, 2010, entitled MULTI-MODAL DATA PREFETCHER, which is hereby incorporated by reference in its entirety.

FIELD OF THE INVENTION

The present invention relates in general to the field of microprocessors, and particularly to data prefetching therein.

BACKGROUND OF THE INVENTION

The Intel® Core™ microarchitecture implements a hardware prefetcher (which has been referred to as the Data Cache Unit Prefetcher) which prefetches into the level-1 data (L1D) cache. Upon recognizing a pattern of loads within a cache line, the Data Cache Unit Prefetcher prefetches the next sequential cache line into the L1D cache. If each successive load was to a lower address than each previous address, the previous sequential cache line is prefetched.

BRIEF SUMMARY OF INVENTION

In one aspect the present invention provides a microprocessor. The microprocessor includes first and second cache memories occupying distinct levels within a cache memory hierarchy of the microprocessor, wherein the second cache memory backs the first cache memory within the cache memory hierarchy. The microprocessor also includes a load unit configured to receive memory load operations. The microprocessor includes a data prefetcher coupled to the first and second cache memories. The data prefetcher is configured to monitor the load operations and maintain a recent history of the load operations from a cache line. The data prefetcher is also configured to determine whether the recent history indicates a clear direction of the load operations from the cache line. The data prefetcher is also configured to prefetch one or more cache lines into the first cache memory when the recent history indicates a clear direction and to prefetch the one or more cache lines into the second cache memory when the recent history does not indicate a clear direction.

In another aspect, the present invention provides a method for prefetching data into a hierarchy of cache memories of a microprocessor, wherein the hierarchy includes first and second cache memories that occupy distinct levels within the hierarchy, wherein the second cache memory backs the first cache memory. The method includes monitoring memory load operations received by a load unit of the microprocessor and maintaining a recent history of the load operations from a cache line. The method also includes determining whether the recent history indicates a clear direction of the load operations from the cache line. The method also includes prefetching one or more cache lines into the first cache memory when the recent history indicates a clear direction and prefetching the one or more cache lines into the second cache memory when the recent history does not indicate a clear direction.

In yet another aspect, the present invention provides a computer program product encoded in at least one computer readable medium for use with a computing device, the computer program product comprising computer readable program code embodied in said medium for specifying a microprocessor. The computer readable program code includes first program code for specifying first and second cache memories occupying distinct levels within a cache memory hierarchy of the microprocessor, wherein the second cache memory backs the first cache memory within the cache memory hierarchy. The computer readable program code also includes second program code for specifying a load unit, configured to receive memory load operations. The computer readable program code also includes third program code for specifying a data prefetcher, coupled to the first and second cache memories. The data prefetcher is configured to monitor the load operations and maintain a recent history of the load operations from a cache line. The data prefetcher is also configured to determine whether the recent history indicates a clear direction of the load operations from the cache line. The data prefetcher is also configured to prefetch one or more cache lines into the first cache memory when the recent history indicates a clear direction and to prefetch the one or more cache lines into the second cache memory when the recent history does not indicate a clear direction.

DETAILED DESCRIPTION OF THE INVENTION

The present disclosure describes a prefetcher with additional prefetching modes over the scheme described above regarding the Intel Data Cache Unit Prefetcher. First, the prefetcher takes into account whether there is a clear load direction and if not, having less confidence, prefetches into the L2 cache rather than the L1D cache. Second, the prefetcher looks at how close together in time the loads to the same cache line occur. If they are relatively close together (e.g., on consecutive clock cycles), the prefetcher prefetches more cache lines than it otherwise would. Third, the prefetcher looks at the size of the loads. If they are relatively large, then the prefetcher prefetches more cache lines than it otherwise would.

Figure 1:
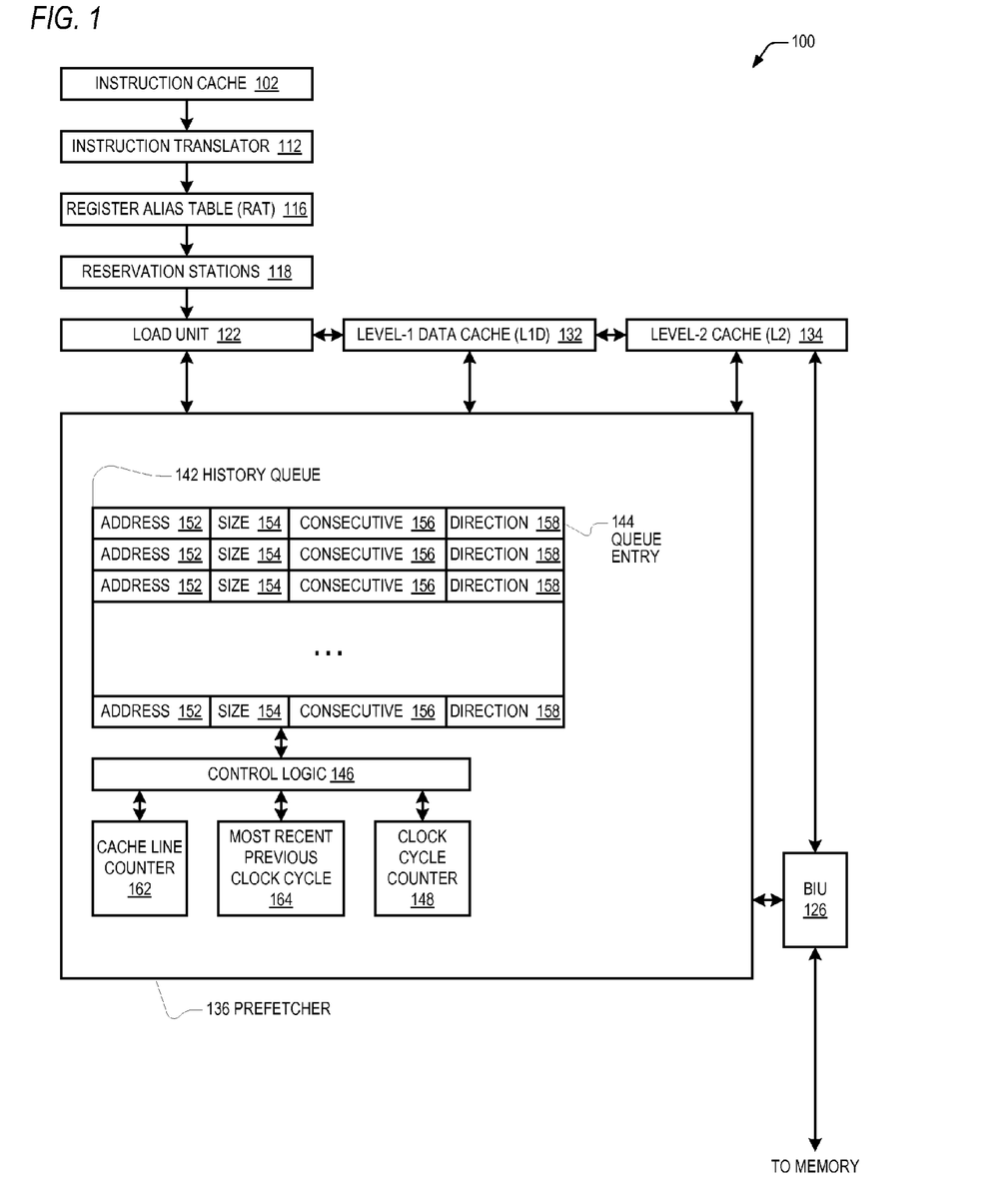
FIG. 1 is a block diagram illustrating a microprocessor having a data prefetcher according to the present invention.

Referring now to FIG. 1, a block diagram illustrating a microprocessor 100 having a data prefetcher 136 according to the present invention is shown. The microprocessor 100 includes an instruction cache 102, coupled to an instruction translator 112, coupled to a register alias table (RAT) 116, coupled to reservation stations 118, coupled to a load unit 122. The reservation stations 118 issue instructions to the load unit 122 (or other execution units, not shown) for execution potentially out of program order. A retire unit (not shown) includes a reorder buffer that enforces retirement of instructions in program order. The load unit 122 reads data from a level-1 data (L1D) cache 132. A level-2 (L2) cache 134 backs the L1D cache 132 and the instruction cache 102. The L2 cache 134 reads and writes system memory via a bus interface unit 126 that interfaces the microprocessor 100 to a bus, such as a local bus or memory bus. The microprocessor 100 also includes a data prefetcher 136, or prefetch unit 136, that prefetches data from system memory into the L2 cache 134 and L1D cache 132 as described in detail herein.

The prefetcher 136 includes control logic 146, which is coupled to control a history queue 142, a cache line counter 162, a clock cycle counter 148, and a most recent previous clock cycle register 164. The history queue 142 is a queue of entries 144. Each queue entry 144 includes an address field 152, a size field 154, a consecutive field 156, and a direction field 158. The address field 152 stores the load address of the load operation for which the respective queue entry 144 was allocated. The size field 154 stores the size (number of bytes) of the load operation. The consecutive indicator 156 indicates whether the load operation was received by the prefetcher 136 on a consecutive clock cycle to the clock cycle in which the most recent previous load operation was received by the prefetcher 136. The direction indicator 158 indicates the direction of the load relative to the most recent previous load.

The cache line counter 162 counts the total number of loads to the current cache line since the prefetcher 136 began tracking accesses to the current cache line, as described below with respect to block 204 of FIG. 2. The clock cycle counter 148 increments each clock cycle of the microprocessor 100. Thus, the value of the clock cycle counter 148 sampled by the control logic 146 when a load operation is received at block 204 may be used as an indicator of the clock cycle in which a new load was received relative to other contemporary loads and, more particularly, to determine whether two load operations were received on consecutive clock cycles in order to populate the consecutive indicator 156 of a queue entry 144. The use of the clock cycle counter 148 and most recent previous clock cycle 164 register are described further below with respect to FIG. 2.

Figure 2:
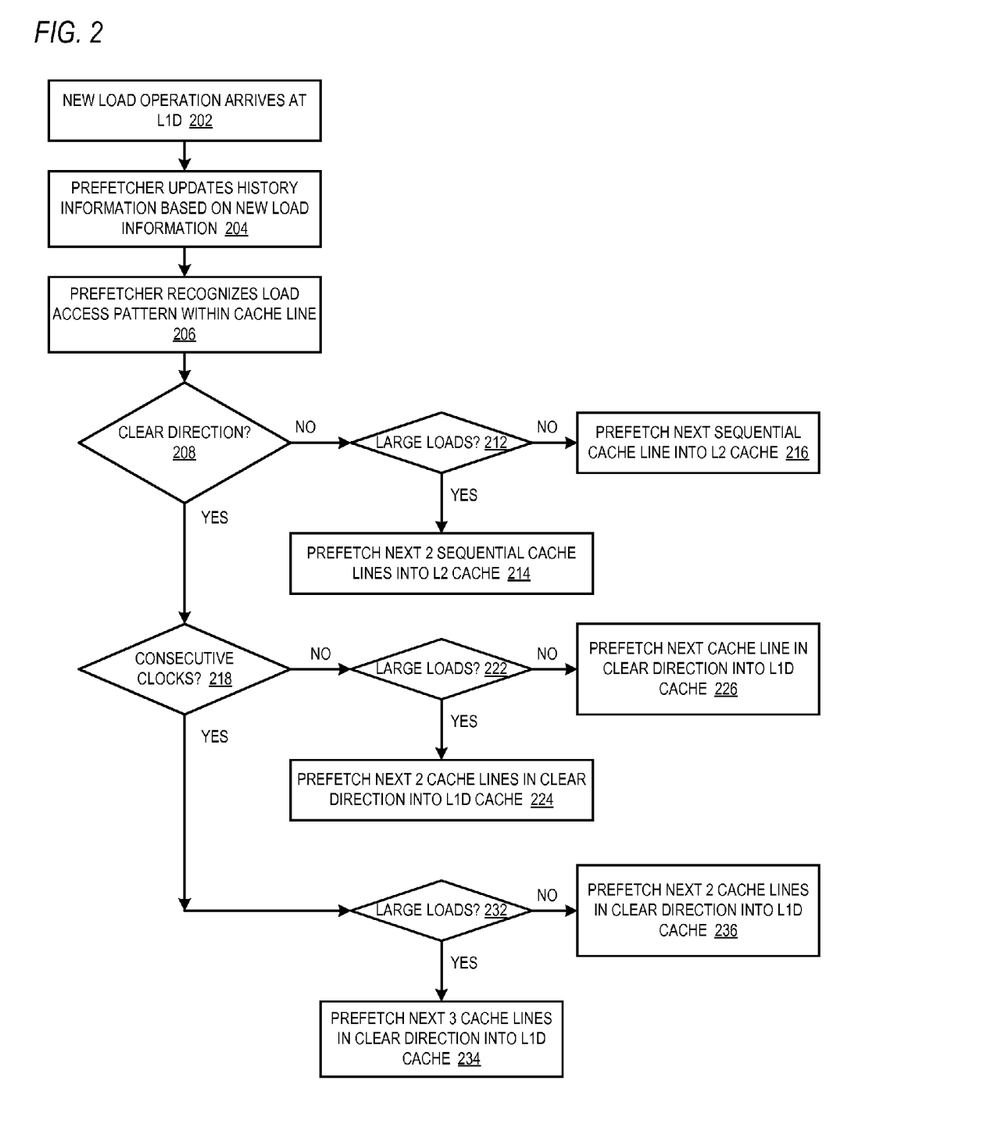
FIG. 2 is a flowchart illustrating operation of the microprocessor of FIG. 1.

Referring now to FIG. 2, a flowchart illustrating operation of the microprocessor 100 of FIG. 1 is shown. Flow begins at block 202.

At block 202, a new load operation arrives at the L1D cache 132 from the load unit 122. The load operation specifies a load address specifying the location in memory from which to fetch the load data and the size of the data, e.g., 1, 2, 4, 8 or 16 bytes. Flow proceeds to block 204.

At block 204, the prefetcher 136 snoops the L1D cache 132 to detect the new load operation and its relevant information. In response, the prefetcher 136 allocates an entry 144 in the history queue 142 and populates the entry 144. In particular, the control logic 146 populates the address field 152 with the load address and populates the size field 154 with the load data size. Additionally, the control logic 146 reads the current value of the clock cycle counter 148 and the current value of the most recent previous clock cycle register 164 and compares them. If the current value of the clock cycle counter 148 is one more than the current value of the most recent previous clock cycle register 164, the control logic 146 sets the value of the consecutive indicator 156 to indicate consecutive cycles; otherwise, the control logic 146 clears the value of the consecutive indicator 156 to indicate non-consecutive cycles. In an alternate embodiment, the control logic 146 sets the value of the consecutive indicator 156 to indicate consecutive cycles if the current value of the clock cycle counter 148 is N more than the current value of the most recent previous clock cycle register 164, where N is a predetermined value; otherwise, the control logic 146 clears the consecutive indicator 156. In one embodiment, N is two; however, the predetermined value is a design choice that may be made based on various factors, such as the size of the L1D cache 132 and/or L2 cache 134. In one embodiment, the predetermined value is programmable via a model specific register (MSR) of the microprocessor 100. After reading the value of the most recent previous clock cycle register 164, the control logic 146 updates it with the value read from the clock cycle counter 148. Additionally, the control logic 146 compares the load address with the address field 152 of the most recent previous load operation in the history queue 142 and populates the direction field 158 to indicate the direction of the new load operation relative to the most recent previous load operation. Additionally, the control logic 146 marks the entry valid by setting a valid bit (not shown) of the entry 144. Additionally, the control logic 146 increments the cache line counter 162. Furthermore, prior to allocating and populating and validating the allocated entry 144 and incrementing the cache line counter 162, the control logic 146 determines whether the load address of the new load operation specifies a location within the same cache line as the other load operations in the history queue 142; if not, the control logic 146 invalidates all the entries 144 in the history queue 142 to begin accumulating history for the new current cache line implicated by the new load operation and clears the cache line counter 162. Flow proceeds to block 206.

At block 206, the prefetcher 136 recognizes a load access pattern within the current cache line implicated by the new load operation. In one embodiment, the prefetcher 136 recognizes a load access pattern within the current cache line when the value of the cache line counter 162 that was incremented at block 204 is greater than or equal to a predetermined value P. In one embodiment, P is four; however, the predetermined value is a design choice that may be made based on various factors, such as the size of the L1D cache 132 and/or L2 cache 134. In one embodiment, the predetermined value is programmable via a model specific register (MSR) of the microprocessor 100. Other methods for detecting a load access pattern within the current cache line may also be employed. Flow proceeds to decision block 208.

At block 208, the prefetcher 136 determines whether there is a clear direction in the load access pattern. In one embodiment, the prefetcher 136 detects a clear direction if the direction indicators 158 of the valid queue entries 144 of the last at least D load operations indicate that they were in the same direction, where D is a predetermined value. In one embodiment, the predetermined value is three; however, the predetermined value is a design choice that may be made based on various factors, such as the size of the L1D cache 132 and/or L2 cache 134. In one embodiment, the predetermined value is programmable via a model specific register (MSR) of the microprocessor 100. An alternate embodiment is described below with respect to FIG. 3 in which the clear direction determination is made by another method. If the prefetcher 136 detects a clear direction, flow proceeds to decision block 218; otherwise, flow proceeds to decision block 212.

At decision block 212, the prefetcher 136 determines whether the load operations to the current cache line are large. In one embodiment, the prefetcher 136 considers the load operations large if the size fields 154 of valid queue entries 144 indicate that all the loads are at least size Y, where Y is a predetermined value. In one embodiment, the predetermined value of Y is eight bytes; however, the predetermined value is a design choice that may be made based on various factors, such as the size of the L1D cache 132 and/or L2 cache 134. In one embodiment, the predetermined value is programmable via a model specific register (MSR) of the microprocessor 100. In an alternate embodiment, the prefetcher 136 considers the load operations large if a majority of the loads are at least size Y, which is determined by comparing two counters that keep track of the number of large and non-large loads, respectively, and which are updated at block 204. If the loads are large, flow proceeds to block 214; otherwise, flow proceeds to block 216.

At block 214, the prefetcher 136 prefetches the next two sequential cache lines into the L2 cache 134. The prefetcher 136 prefetches into the L2 cache 134 rather than the L1D cache 132 if it determined at decision block 208 that there is no clear direction, because there is a lower confidence level that the prefetched data will actually be needed, therefore the prefetcher 136 is less willing to displace potentially useful data in the L1D cache 132. Flow ends at block 214.

At block 216, the prefetcher 136 prefetches only the next sequential cache line into the L2 cache 134. Flow ends at block 216.

At decision block 218, the prefetcher 136 determines whether the load operations to the current cache line are being received on consecutive clock cycles. Loads received on consecutive clock cycles implies that the program is walking through memory very quickly, so the prefetcher 136 needs to prefetch further ahead than it otherwise would in order to stay ahead of the program, i.e., in order to have future cache lines in the L1D cache 132 by the time the program needs them. In one embodiment, the prefetcher 136 considers the load operations as being received on consecutive clock cycles if the consecutive indicators 156 of the valid queue entries 144 of the most recent at least C loads from the current cache line are set, where C is a predetermined value. In one embodiment, the predetermined value of C is three; however, the predetermined value is a design choice that may be made based on various factors, such as the size of the L1D cache 132 and/or L2 cache 134. In one embodiment, the predetermined value is programmable via a model specific register (MSR) of the microprocessor 100. If the loads are on consecutive clock cycles, flow proceeds to decision block 232; otherwise, flow proceeds to decision block 222.

At decision block 222, the prefetcher 136 determines whether the load operations to the current cache line are large, similar to the manner described above with respect to decision block 212. If the loads are large, flow proceeds to block 224; otherwise, flow proceeds to block 226.

At block 224, the prefetcher 136 prefetches the next two cache lines in the clear direction determined at block 208 into the L1D cache 132. The prefetcher 136 prefetches into the L1D cache 132 rather than the L2 cache 134 if it determined at decision block 208 that there is a clear direction, because there is a higher confidence level that the prefetched data will actually be needed, therefore the prefetcher 136 is more willing to displace potentially useful data in the L1D cache 132. Flow ends at block 224.

At block 226, the prefetcher 136 prefetches only the next cache line in the clear direction determined at block 208 into the L1D cache 132. Flow ends at block 226.

At decision block 232, the prefetcher 136 determines whether the load operations to the current cache line are large, similar to the manner described above with respect to decision block 212. If the loads are large, flow proceeds to block 234; otherwise, flow proceeds to block 236.

At block 234, the prefetcher 136 prefetches the next three cache lines in the clear direction determined at block 208 into the L1D cache 132. Flow ends at block 234.

At block 236, the prefetcher 136 prefetches the next two cache lines in the clear direction determined at block 208 into the L1D cache 132. Flow ends at block 236.

Figure 3:
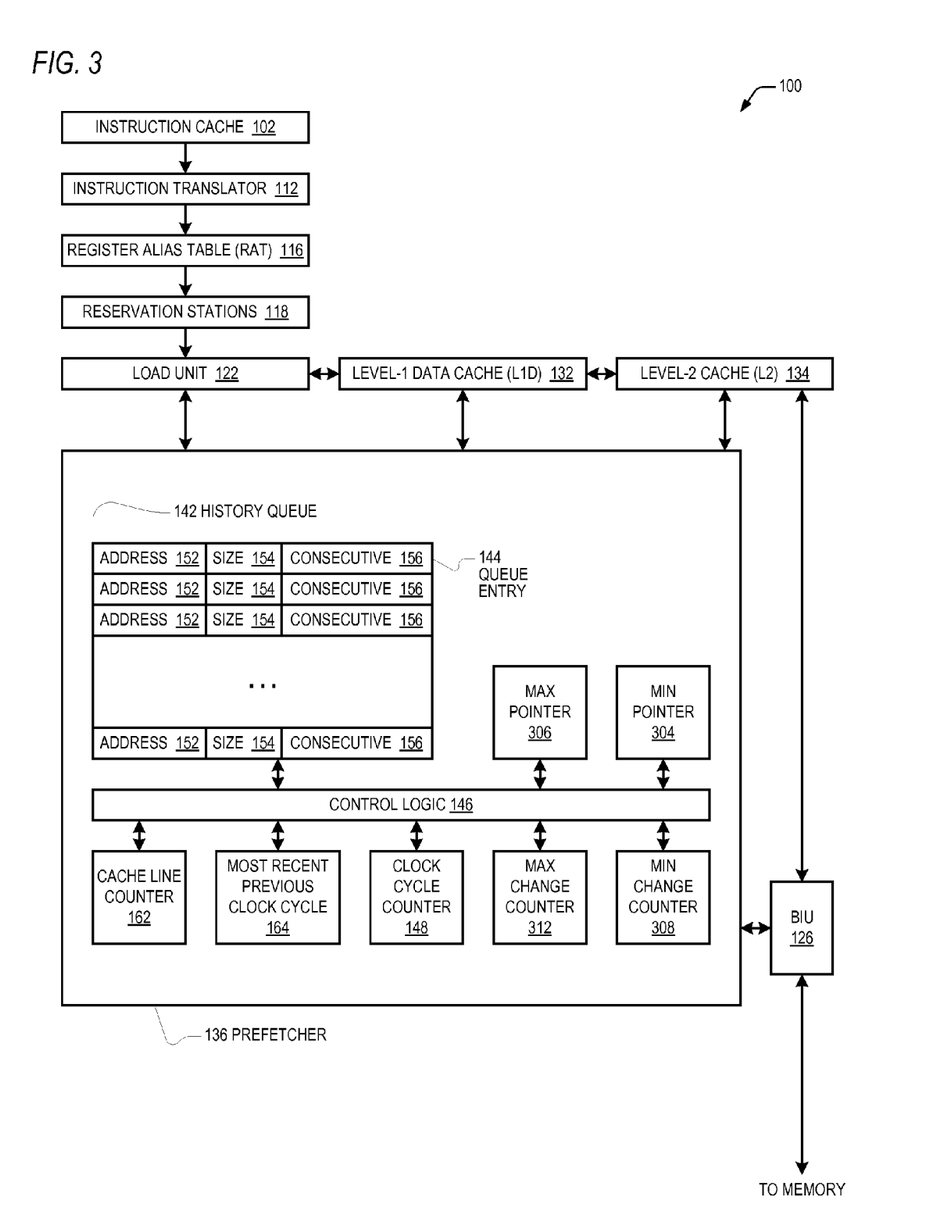
FIG. 3 is a block diagram illustrating a microprocessor having a data prefetcher according to an alternate embodiment of the present invention.

Referring now to FIG. 3, a block diagram illustrating a microprocessor 100 having a data prefetcher 136 according to an alternate embodiment of the present invention is shown. The prefetcher 136 of FIG. 3 is similar to the prefetcher 136 of FIG. 1 and operates similar to the manner described in the flowchart of FIG. 2 with the following differences. The prefetcher 136 of FIG. 3 updates the history information at block 204 and makes the clear direction decision at decision block 208 of FIG. 2 differently as described below. The queue entries 144 of the history queue 142 of the embodiment of FIG. 3 do not include a direction field 158. Additionally, the prefetcher 136 includes a min pointer register 304 and a max pointer register 306 that the control logic 146 maintains to point to the lowest and highest address offset, respectively, within the current cache line that has been accessed since the prefetcher 136 began tracking accesses to the current cache line. The prefetcher 136 also includes a min change counter 308 and a max change counter 312 that count the number of changes to the min pointer 304 and the max pointer 306, respectively, since the prefetcher 136 began tracking accesses to the current cache line. The operation of the prefetcher 136 at block 204 of FIG. 2 according to the alternate embodiment of FIG. 3 is as follows. The control logic 146 determines whether there is a clear direction by determining whether the difference between the min change counter 308 and the max change counter 312 is greater than a predetermined value. In one embodiment, the predetermined value is one; however, the predetermined value is a design choice that may be made based on various factors, such as the size of the L1D cache 132 and/or L2 cache 134. In one embodiment, the predetermined value is programmable via a model specific register (MSR) of the microprocessor 100. If the min change counter 308 is greater than the max change counter 312 by the predetermined amount, then the clear direction is downward; if the max change counter 312 is greater than the min change counter 308 by the predetermined amount, then the clear direction is upward; otherwise, there is no clear direction. Furthermore, if the load address of the new load operation does not specify a location within the same cache line as the other load operations in the history queue 142, the control logic 146 clears the max change counter 312 and the min change counter 308.

Figure 4:
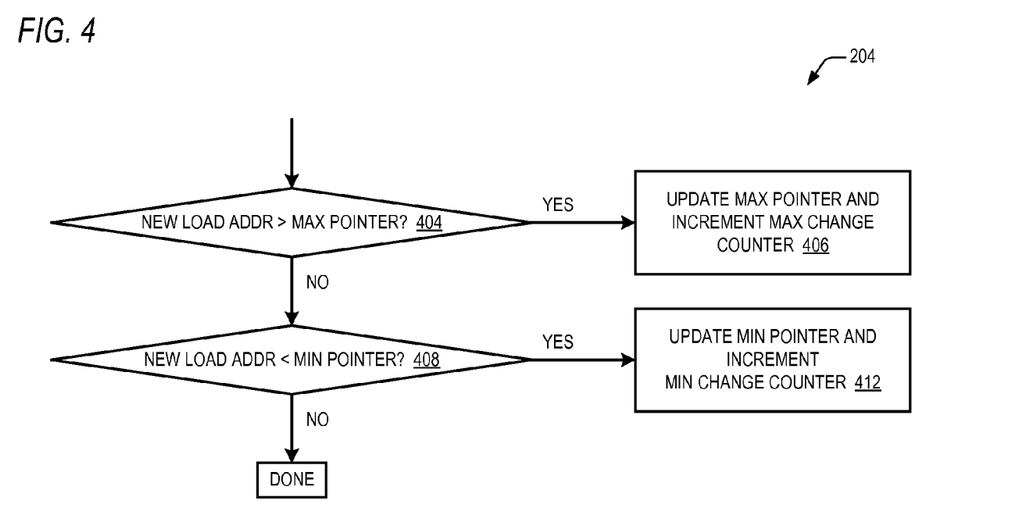
FIG. 4 is a flowchart illustrating operation of the prefetcher of the alternate embodiment of FIG. 3 to perform the operation at block 204 of FIG. 2.

Referring now to FIG. 4, a flowchart illustrating operation of the prefetcher 136 of the alternate embodiment of FIG. 3 to perform the operation at block 204 of FIG. 2 is shown. Flow begins at decision block 404.

At decision block 404, the control logic 146 determines whether the new load address—more specifically, the new load address offset within the current cache line—is greater than the max pointer 306 value. If so, flow proceeds to block 406; otherwise, flow proceeds to decision block 408.

At block 406, the control logic 146 updates the max pointer 306 with the new load address offset and increments the max change counter 312. Flow ends at block 406.

At decision block 408, the control logic 146 determines whether the new load address offset within the current cache line is less than the min pointer 304 value. If so, flow proceeds to block 412; otherwise, flow ends.

At block 412, the control logic 146 updates the min pointer 304 with the new load address offset and increments the min change counter 308. Flow ends at block 412.

Although embodiments have been described above with respect to load operations, other embodiments are contemplated that perform similar prefetching with respect to store operations.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, or other communications medium. Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor, comprising:
    first and second cache memories, occupying distinct levels within a cache memory hierarchy of the microprocessor, wherein the second cache memory backs the first cache memory within the cache memory hierarchy;
    a load unit, configured to receive memory load operations; and
    a data prefetcher, coupled to the first and second cache memories, configured to:
        monitor the load operations and maintain a recent history of the load operations from a cache line;
        determine whether the recent history indicates a clear direction of the load operations from the cache line; and
        prefetch one or more cache lines into the first cache memory when the recent history indicates a clear direction and to prefetch the one or more cache lines into the second cache memory when the recent history does not indicate a clear direction.

2. The microprocessor of claim 1, wherein the one or more cache lines prefetched into the first cache memory are the next one or more cache lines to the cache line in the clear direction.

3. The microprocessor of claim 2, wherein the one or more cache lines prefetched into the second cache memory are the next sequential one or more cache lines to the cache line.

4. The microprocessor of claim 1, wherein the recent history indicates a clear direction when the last at least D of the load operations are in the same direction, wherein D is a predetermined integer greater than 1.

5. The microprocessor of claim 4, wherein D is user-programmable.

6. The microprocessor of claim 1, wherein the recent history includes a lowest and highest address offset of the load operations from the cache line and a lowest and highest count of the changes to the lowest and highest address offset, respectively, since the data prefetcher began maintaining the recent history of the load operations from the cache line, wherein the recent history indicates a clear direction when the difference between the lowest and highest counts is greater than a predetermined value.

7. The microprocessor of claim 6, wherein the predetermined value is user-programmable.

8. The microprocessor of claim 1, wherein the data prefetcher is further configured to determine whether the recent history indicates the load operations are large, wherein the number of the one or more cache lines prefetched by the data prefetcher is greater when the load operations are large than not.

9. The microprocessor of claim 8, wherein the recent history indicates the load operations are large when all of the load operations are at least Y bytes, wherein Y is a predetermined value.

10. The microprocessor of claim 9, wherein Y is user-programmable.

11. The microprocessor of claim 8, wherein the recent history indicates the load operations are large when a majority of the load operations are at least Y bytes, wherein Y is a predetermined value.

12. The microprocessor of claim 8, wherein when the recent history does not indicate a clear direction, the data prefetcher is configured to prefetch the next two sequential cache lines to the cache line into the second cache memory if the load operations are large and to otherwise prefetch the next one sequential cache line into the second cache memory.

13. The microprocessor of claim 1, wherein when the recent history indicates a clear direction, the data prefetcher is further configured to determine whether the recent history indicates the load operations are being received on consecutive clock cycles, wherein the number of the one or more cache lines prefetched into the first cache memory by the data prefetcher is greater when the load operations are being received on consecutive clock cycles than not.

14. The microprocessor of claim 13, wherein the recent history indicates the load operations are being received on consecutive clock cycles when the most recent at least C of the load operations from the cache line were received on a consecutive clock cycle to the previous load operation, wherein C is a predetermined integer greater than one.

15. The microprocessor of claim 14, wherein C is user-programmable.

16. The microprocessor of claim 13, wherein the data prefetcher is further configured to determine whether the recent history indicates the load operations are large, wherein the number of the one or more cache lines prefetched into the first cache memory by the data prefetcher is greater when the load operations are large than not.

17. The microprocessor of claim 16, further comprising:
    wherein when the load operations are being received on consecutive clock cycles and the load operations are large, the data prefetcher is configured to prefetch the next three cache lines to the cache line in the clear direction into the first cache memory; and
    wherein when the load operations are being received on consecutive clock cycles and the load operations are not large, the data prefetcher is configured to prefetch the next two cache lines to the cache line in the clear direction into the first cache memory.

18. The microprocessor of claim 17, further comprising:
    wherein when the load operations are not being received on consecutive clock cycles and the load operations are large, the data prefetcher is configured to prefetch the next two cache lines to the cache line in the clear direction into the first cache memory; and wherein when the load operations are not being received on consecutive clock cycles and the load operations are not large, the data prefetcher is configured to prefetch the next one cache line to the cache line in the clear direction into the first cache memory.

19. The microprocessor of claim 1, wherein the data prefetcher is configured to refrain from prefetching the one or more cache lines unless the number of load operations from the cache line in the recent history is at least P, wherein P is a predetermined value.

20. The microprocessor of claim 19, wherein P is user-programmable.

21. A method for prefetching data into a hierarchy of cache memories of a microprocessor, wherein the hierarchy includes first and second cache memories that occupy distinct levels within the hierarchy, wherein the second cache memory backs the first cache memory, the method comprising:
    monitoring memory load operations received by a load unit of the microprocessor and maintaining a recent history of the load operations from a cache line;
    determining whether the recent history indicates a clear direction of the load operations from the cache line; and
    prefetching one or more cache lines into the first cache memory when the recent history indicates a clear direction and prefetching the one or more cache lines into the second cache memory when the recent history does not indicate a clear direction.

22. The method of claim 21, wherein the one or more cache lines prefetched into the first cache memory are the next one or more cache lines to the cache line in the clear direction.

23. The method of claim 22, wherein the one or more cache lines prefetched into the second cache memory are the next sequential one or more cache lines to the cache line.

24. The method of claim 21, wherein the recent history indicates a clear direction when the last at least D of the load operations are in the same direction, wherein D is a predetermined integer greater than 1.

25. The method of claim 21, wherein the recent history includes a lowest and highest address offset of the load operations from the cache line and a lowest and highest count of the changes to the lowest and highest address offset, respectively, since said maintaining the recent history of the load operations from the cache line began, wherein the recent history indicates a clear direction when the difference between the lowest and highest counts is greater than a predetermined value.

26. The method of claim 21, further comprising:
    determining whether the recent history indicates the load operations are large, wherein the number of the one or more cache lines prefetched is greater when the load operations are large than not.

27. The method of claim 26, wherein the recent history indicates the load operations are large when all of the load operations are at least Y bytes, wherein Y is a predetermined value.

28. The method of claim 26, wherein the recent history indicates the load operations are large when a majority of the load operations are at least Y bytes, wherein Y is a predetermined value.

29. The method of claim 26, wherein when the recent history does not indicate a clear direction, said prefetching the one or more cache lines into the second cache memory comprises prefetching the next two sequential cache lines to the cache line into the second cache memory if the load operations are large and to otherwise prefetching the next one sequential cache line into the second cache memory.

30. The method of claim 21, further comprising:
    when the recent history indicates a clear direction, determining whether the recent history indicates the load operations are being received on consecutive clock cycles, wherein the number of the one or more cache lines prefetched into the first cache memory is greater when the load operations are being received on consecutive clock cycles than not.

31. The method of claim 30, wherein the recent history indicates the load operations are being received on consecutive clock cycles when the most recent at least C of the load operations from the cache line were received on a consecutive clock cycle to the previous load operation, wherein C is a predetermined integer greater than one.

32. The method of claim 30, further comprising:
    determining whether the recent history indicates the load operations are large, wherein the number of the one or more cache lines prefetched into the first cache memory is greater when the load operations are large than not.

33. The method of claim 32, further comprising:
    when the load operations are being received on consecutive clock cycles and the load operations are large, prefetching the next three cache lines to the cache line in the clear direction into the first cache memory; and
    when the load operations are being received on consecutive clock cycles and the load operations are not large, prefetching the next two cache lines to the cache line in the clear direction into the first cache memory.

34. The method of claim 33, further comprising:
    when the load operations are not being received on consecutive clock cycles and the load operations are large, prefetching the next two cache lines to the cache line in the clear direction into the first cache memory; and
    when the load operations are not being received on consecutive clock cycles and the load operations are not large, prefetching the next one cache line to the cache line in the clear direction into the first cache memory.

35. The method of claim 21, further comprising:
    refraining from prefetching the one or more cache lines unless the number of load operations from the cache line in the recent history is at least P, wherein P is a predetermined value.

36. A computer program product encoded in at least one non-transitory computer usable medium for use with a computing device, the computer program product comprising:
    computer readable program code embodied in said medium, for specifying a microprocessor, the computer readable program code comprising:
        first program code for specifying first and second cache memories, occupying distinct levels within a cache memory hierarchy of the microprocessor, wherein the second cache memory backs the first cache memory within the cache memory hierarchy;
        second program code for specifying a load unit, configured to receive memory load operations; and
        third program code for specifying a data prefetcher, coupled to the first and second cache memories, configured to:
            monitor the load operations and maintain a recent history of the load operations from a cache line;
            determine whether the recent history indicates a clear direction of the load operations from the cache line; and
            prefetch one or more cache lines into the first cache memory when the recent history indicates a clear direction and to prefetch the one or more cache lines into the second cache memory when the recent history does not indicate a clear direction.

37. The computer program product of claim 36, wherein the at least one non-transitory computer usable medium is selected from the set of a disk, tape, or other magnetic, optical, or electronic storage medium and a network, wire line, or other communications medium.

* * * * *